US007633195B2

(12) United States Patent
Drubel et al.

(10) Patent No.: US 7,633,195 B2

(45) Date of Patent: Dec. 15, 2009

(54) ELECTRICAL MACHINE WITH INTEGRATED ELECTRONIC POWER DEVICE

(75) Inventors: Oliver Drubel, Nussbaumen (CH); Reinhard Joho, Rombach (CH)

(73) Assignee: ALSTOM Technology Ltd., Baden (CH)

(*) Notice: Subject to any disclaimer, the term of this patent is extended or adjusted under 35 U.S.C. 154(b) by 423 days.

(21) Appl. No.: 10/390,039

(22) Filed: Mar. 18, 2003

(65) Prior Publication Data

US 2003/0193249 A1 Oct. 16, 2003

(30) Foreign Application Priority Data

Mar. 18, 2002 (CH) .................................... 0467/02

(51) Int. Cl.
*H02K 9/00* (2006.01)

(52) U.S. Cl. .......................................... 310/58; 310/64

(58) Field of Classification Search .................. 310/52, 310/54, 58, 64
See application file for complete search history.

(56) References Cited

U.S. PATENT DOCUMENTS

| | | | | |
|---|---|---|---|---|
| 3,568,016 | A * | 3/1971 | Barber | 318/78 |
| 4,682,068 | A | 7/1987 | Cotzas et al. | 310/198 |
| 4,961,016 | A * | 10/1990 | Peng et al. | 310/62 |
| 5,763,969 | A * | 6/1998 | Metheny et al. | 310/62 |
| 5,955,804 | A * | 9/1999 | Kusase et al. | 310/59 |
| 6,069,426 | A | 5/2000 | Baader et al. | 310/67 R |
| 6,169,344 | B1 * | 1/2001 | Tsuruhara | 310/58 |
| 6,633,098 | B2 * | 10/2003 | Inaba et al. | 310/58 |

FOREIGN PATENT DOCUMENTS

| | | |
|---|---|---|
| DE | 1144 383 | 2/1963 |
| DE | 199 45 368 | 3/2001 |
| EP | 0 412 645 | 2/1991 |
| EP | 0 707 372 | 4/1996 |
| EP | 0 812 052 | 12/1997 |
| JP | 03040733 * | 1/1991 |

OTHER PUBLICATIONS

Dictionary of Science, Dell Publishing Co. Inc, 1969. p. 97.*

Search Report, prepared by the European Patent Office, for Swiss Appl. No. CH 4672002.

* cited by examiner

*Primary Examiner*—Nguyen N Hanh

(74) *Attorney, Agent, or Firm*—Cermak Kenealy Vaidya & Nakajima LLP; Adam J. Cermak

(57) ABSTRACT

An electrical machine (10) includes a rotor (12) and a stator (11) arranged within a machine housing (23) which are cooled by at least one cooling circuit (16A, 16B). The machine (10) further includes power semiconductors which constitute part of an electronic power device (18) associated with the machine (10), and which are arranged within the machine housing (23) and are cooled by a cooling device (19, . . . , 21). A flexible arrangement and cooling of the electronic power device (18) is achieved by providing a cooling device (19, . . . , 21) for the electronic power device (18) which is independent of the at least one cooling circuit (16A, 16B) of the rotor (12)and the stator (11).

11 Claims, 3 Drawing Sheets

22
31
30
29
28
23
26
27
17
24
25
15
12
16B
10
16A
11
13
14

32
22
33
23
17
24
25
15
16B
12
10
16A
11
13
14

ELECTRICAL MACHINE WITH INTEGRATED ELECTRONIC POWER DEVICE

This application claims priority under 35 U.S.C. § 119 to Swiss Application Number 2002 0467/02, filed Mar. 18, 2002, the entirety of which is incorporated by reference herein.

FIELD OF INVENTION

The present invention is relevant to the field of electrical machines, including an electrical machine with an integrated electronic power device.

PRIOR ART

An electrical machine of the aforementioned kind in the form of a generator is known, for example, from EP-B1-0 707 372.

By integrating the electronic power components (diodes, thyristors, IGBT'S, etc.) and devices (frequency converters) that operate in conjunction with an electrical machine, it is possible to significantly reduce the complexity of the overall machine-electronic power device system. The integrated components generate heat as a result of power dissipation, and the machine itself generates a considerable amount of heat; thus, care must be taken to safely and effectively dissipate such heat under all operating conditions.

In small electrical machines, the type used in power-driven vehicles, for example, the integrated electronics are sufficiently cooled by arranging power semiconductors on a cooling body which is in direct contact with the inner wall surface of the stator bearer (cf. DE-A1-199 45 368).

If the electrical machine is itself equipped with an active cooling means, the integrated power electronics can be arranged so that the cooling medium of the machine cooling system flows through and cools the former. In a standard dimensioned motor with integrated frequency converter and fan cooling system it is possible to attach the converter module to the fan shield or integrate it within a fan shield (cf. EP-A1-0 812 052). In a larger, polyphase generator the integrated frequency converter may be arranged in the machine housing so that at least portions of the converter are located within the flow of the cooling medium-circuit of the generator (cf. EP-B1-0 707 372).

A drawback of such known means for cooling integrated electronic power devices is that the arrangement of the components being cooled in the machine is restricted, and that—where integration in the cooling circuit of the machine is involved—cooling of the electronic power device is dependent on the cooling of the machine and is not readily adaptable to, in part, differing requirements. Thus, it is not feasible to use a cooling fluid for cooling the electronic power device, which differs from that used in the cooling circuit of the machine. Further problems may arise in that during machine start-up it is necessary for the electronic power component to already be fully cooled, but where the (rotationally-dependent) machine cooling has not yet provided sufficient cooling capacity due to a slow rotational speed.

BRIEF DESCRIPTION OF THE INVENTION

Thus, the object of the present invention is to design an electrical machine with integrated electronic power device that eliminates the drawbacks of the prior art solutions and which provides substantially greater flexibility in the arrangement of the electronic power device within the machine and associated cooling system.

One aspect of the present invention includes designing the cooling of the electronic power device and of the associated power semiconductors independent of the cooling circuit of the rotor and stator of the machine. By this design, it is possible in a simple way to optimally place the power semiconductors within the machine housing and to design and guide such cooling independent of the operating state of the machine.

Preferably, this applies to machines in which the electronic power device is a converter, in particular, a frequency converter.

Numerous advantages result when the electrical machine is a generator.

A preferred embodiment of the present invention is characterized in that the electrical machine includes a coil and in that the power semiconductors are at least partially integrated in said coil.

The machine design is rendered particularly flexible if, in accordance with a second preferred embodiment of the present invention, the cooling means comprises at least one independent cooling circuit.

BRIEF DESCRIPTION OF THE DRAWINGS

Preferred embodiments of the present invention are described in greater detail with reference to the drawings, in which.

WAYS OF IMPLEMENTING THE INVENTION

Figure 1:
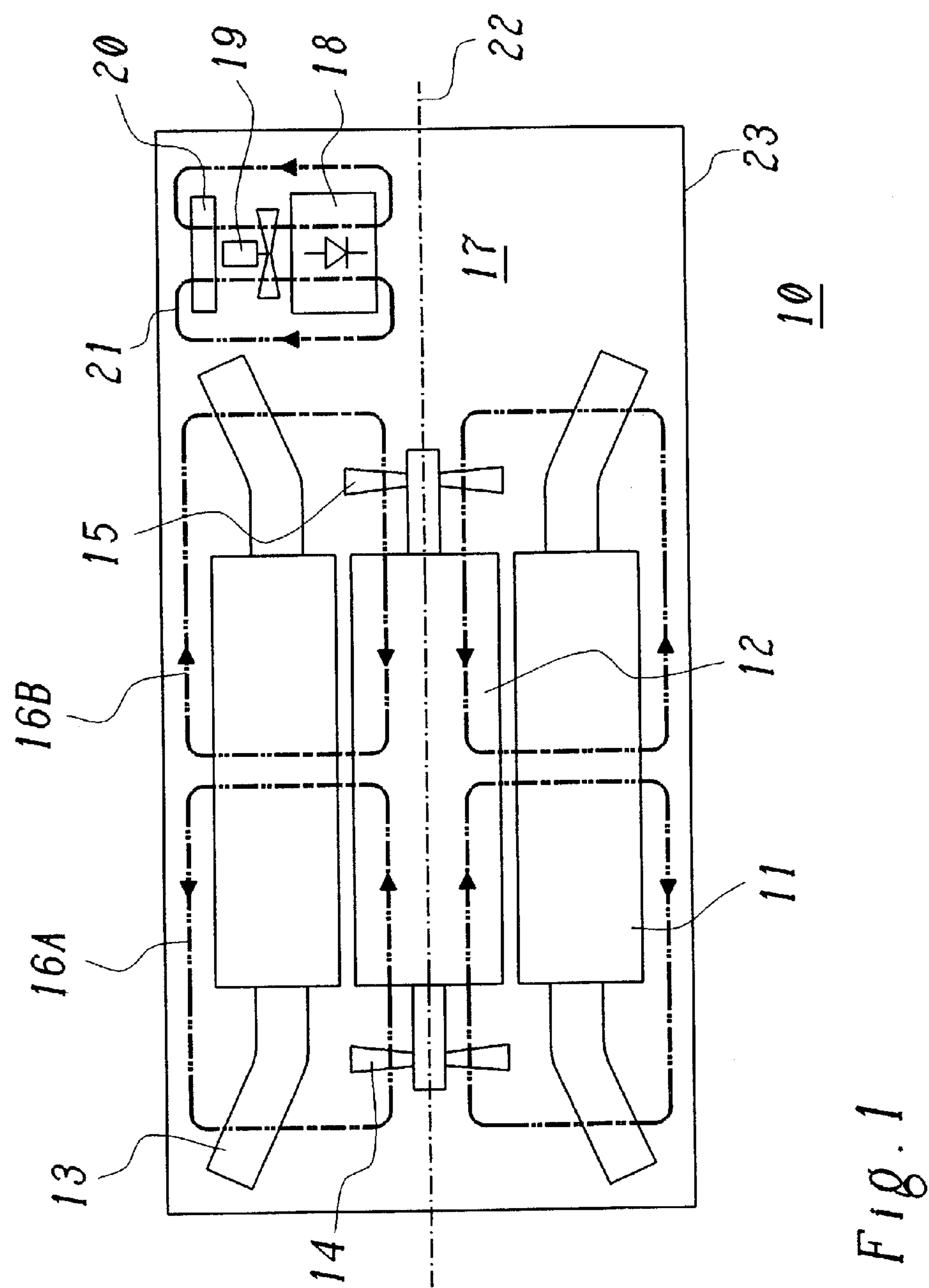
FIG. 1 is a highly schematic view of an electrical machine with integrated electronic power device and independent cooling circuit according to a first embodiment of the present invention.

FIG. 1 shows a highly schematic view of an electrical machine 10 with integrated electronic power device and independent cooling circuit 21 according to a first embodiment of the present invention. The electrical machine 10 is, e.g. a high power generator of the type used in power plants. The electrical machine 10 is arranged in a machine housing 23 closed to the outside. It comprises a rotor 12 rotatable about an axis 22, which is surrounded concentrically by a stator 11 with a coil 13. Arranged on either side of rotor 12 on the shaft of rotor 12 are fans 14, 15, which circulate a cooling fluid (air or other gas) in a cooling circuit, or multiple cooling circuits 16A, 16B in order to dissipate heat generated in the rotor 12 and stator 11 when the machine is in operation. It is understood that because the rotor 12 is coupled to fans 14, 15, such cooling is closely dependent on the rotational speed of the machine.

Arranged in a free space 17 within the machine housing 23 is an electronic power device in the form of a converter 18, which contains various power semiconductors (indicated by the diode symbol in FIG. 1). Said converter 18 is cooled by way of an independent cooling circuit 21, indicated in FIG. 1 by the closed, dashed and dot line circuits and directional arrow. The cooling circuit 21 may be configured in various ways. In the example in FIG. 1, said circuit contains a motor-actuated fan 19 and a heat exchanger (cooler) 20, in which heat is withdrawn from cooling circuit 21 and conveyed outwardly. It is understood that heat exchanger 20 may be omitted if converter 18 is cooled by ordinary ambient air. With the cooling circuit 21 independent of cooling circuits 16A, 16B it is possible to adapt the cooling of converter 18 to the requirements dictated by the operation of said converter. Moreover, it is possible to optimally position the converter 18 with its associated cooling circuit 21 within the machine housing 23 without regard to the cooling of the machine.

Figure 2:
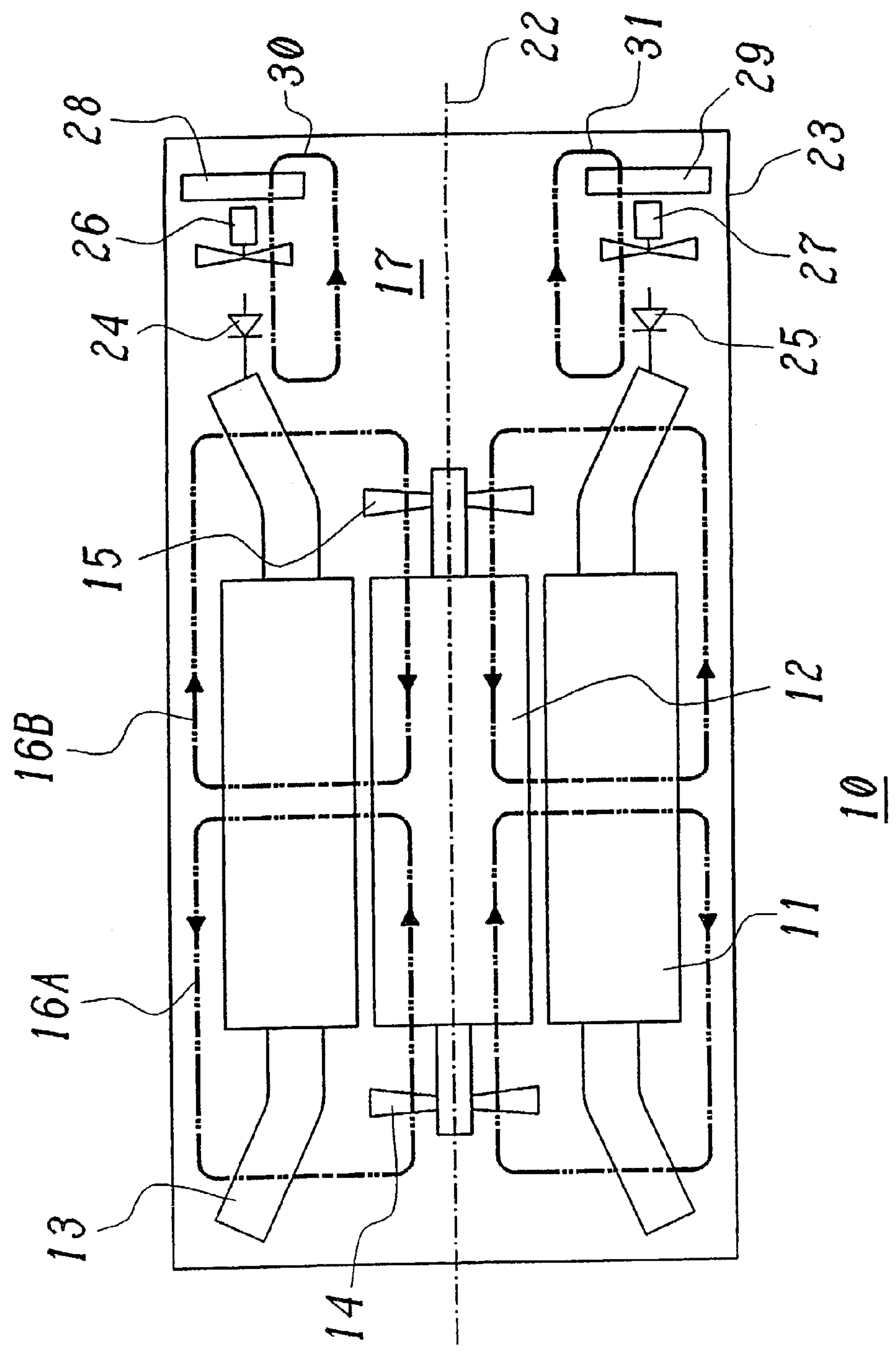
FIG. 2 is a view similar to FIG. 1 of an electrical machine with integrated electronic power device, parts of which are integrated in the coil and cooled by independent cooling circuits.

A second embodiment of the present invention is shown in FIG. 2. In this case, parts of the electronic power device in the form of individual power semiconductors 24,25 are integrated in the coil 13 of the electrical machine 10 (indicated in FIG. 2 by the diode symbol which is directly connected to the stator coil). Here too, integrated power semiconductors 24, 25 are allotted individual cooling circuits 30, 31, which may incorporate—as in FIG. 1—a motor-actuated fan 26, 27 and a heat exchanger (cooler) 28, 29. The ventilators 26, 27—as well as the ventilator 19 in FIG. 1—may be connected to an independent control means that controls the cooling process for the electronic power device and associated parts, independent of the cooling of the machine.

Figure 3:
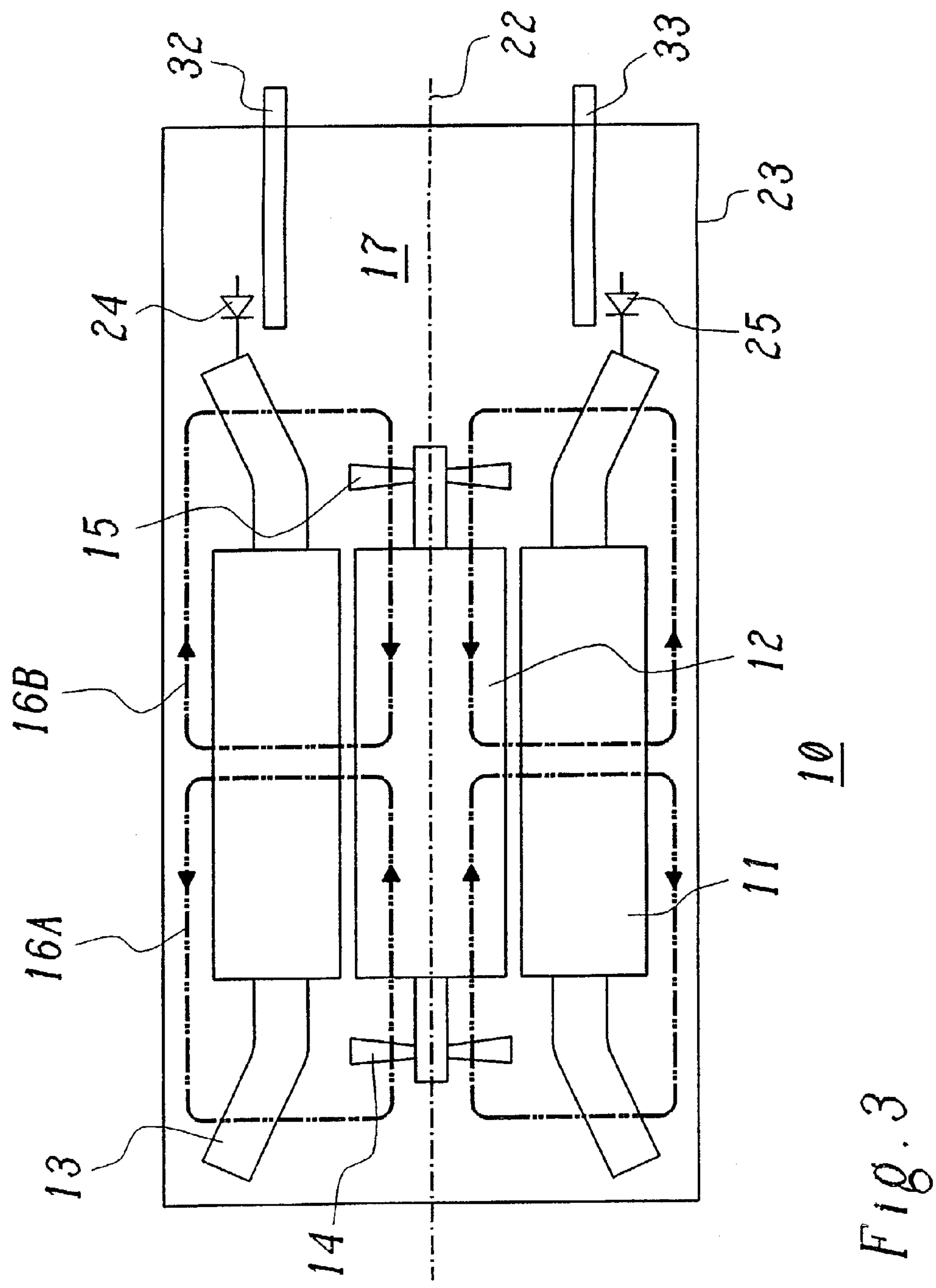
FIG. 3 is a view similar to FIG. 1 of an electrical machine with integrated electronic power device, parts of which are integrated in the coil, and in which heat is dissipated by means of heat pipes.

However, it is also contemplated that the power semiconductors 24,25 integrated in the coil 13 may not be directly incorporated in a cooling circuit, but rather—as shown in FIG. 3—may be coupled to a fluid circuit or heat pipes 32,33, in which in a known manner heat is transported out of the free space 17 or is conveyed to a cooling circuit arranged at another location.

In sum, the result of the present invention is an electrical machine distinguished by the following advantages and features:

- Because the electronic power components are not disposed directly in the cooling circuit of the cooling fluid for the machine, it is possible to adapt the cooling to the requirements of said components independently of the cooling of the machine. This makes it possible, therefore, to select from various cooling fluids.
- The placement of the components is not determined by the cooling circuit of the cooling fluid for the machine or the coil.
- It is possible to cool the electronic power components during machine start-up at a point when the electrical machine, due to the slow rotational speed thereof, is not yet sufficiently cooled.

LIST OF REFERENCE NUMERALS

| | |
|---|---|
| 10 | stator |
| 11 | stator |
| 12 | rotor |
| 13 | stator coil (coil end) |
| 14, 15 | fan |
| 16A, B | cooling circuit |
| 17 | free space |
| 18 | converter |
| 19 | fan |
| 20 | heat exchanger |
| 21 | cooling circuit |
| 22 | axis |
| 23 | machine housing |
| 24, 25 | power semiconductor |
| 26, 27 | fan |
| 28, 29 | heat exchanger |
| 30, 31 | cooling circuit |
| 32, 33 | heat pipe or fluid circuit |

We claim:

1. An electrical machine comprising:

a machine housing;

at least one cooling circuit;

a rotor having a shaft;

a stator;

wherein the rotor and stator are arranged within the machine housing and cooled by the at least one cooling circuit;

wherein the at least one cooling circuit comprises a fan arranged on said rotor shaft;

an electronic power unit including cooling means and power semiconductors arranged in the machine housing, the power semiconductors cooled by the cooling means;

wherein said cooling means is independent of the at least one cooling circuit of the rotor and the stator, said cooling means for exclusively cooling the electronic power unit;

wherein said cooling means comprises and is driven by means arranged separately from said rotor shaft; and wherein the electrical machine comprises a generator.

2. An electrical machine according to claim 1, wherein the electronic power device comprises a converter.

3. An electrical machine according to claim 1, wherein the electrical machine includes a coil, and wherein the power semiconductors are at least partially integrated in said coil.

4. An electrical machine according to claim 1, wherein the cooling means comprises fluid circuits or heat pipes which dissipate heat outwardly from the power semiconductors.

5. An electrical machine according to claim 1, wherein said cooling means comprises at least one independent cooling circuit.

6. An electrical machine according to claim 2, wherein the converter comprises a frequency converter.

7. An electrical machine comprising:

a machine housing;

at least one cooling circuit;

a rotor having a shaft;

a stator;

wherein the rotor and stator are arranged within the machine housing and cooled by the at least one cooling circuit;

wherein the at least one cooling circuit comprises a fan arranged on said rotor shaft;

an electronic power unit including cooling means and power semiconductors arranged in the machine housing, the power semiconductors cooled by the cooling means; and a coil, wherein the power semiconductors are at least partially integrated in said coil;

wherein said cooling means is independent of the at least one cooling circuit of the rotor and the stator, said cooling means for exclusively cooling the electronic power unit;

wherein said cooling means comprises and is driven by means arranged separately from said rotor shaft.

8. An electrical machine according to claim 7, wherein the electronic power device comprises a converter.

9. An electrical machine according to claim 8, wherein the converter comprises a frequency converter.

10. An electrical machine according to claim 7, wherein the cooling means comprises fluid circuits or heat pipes which dissipate heat outwardly from the power semiconductors.

11. An electrical machine according to claim 7, wherein said cooling means comprises at least one independent cooling circuit.

* * * * *